May 24, 1966  A. DEUTCH  3,252,654
DISPENSING SPIGOT CONTROLLING AND RECORDING DEVICE
Filed June 17, 1963  3 Sheets-Sheet 1

INVENTOR.
ARTHUR DEUTCH
BY
ATTORNEYS

INVENTOR.
ARTHUR DEUTCH

ATTORNEYS

May 24, 1966 A. DEUTCH 3,252,654
DISPENSING SPIGOT CONTROLLING AND RECORDING DEVICE
Filed June 17, 1963 3 Sheets-Sheet 3
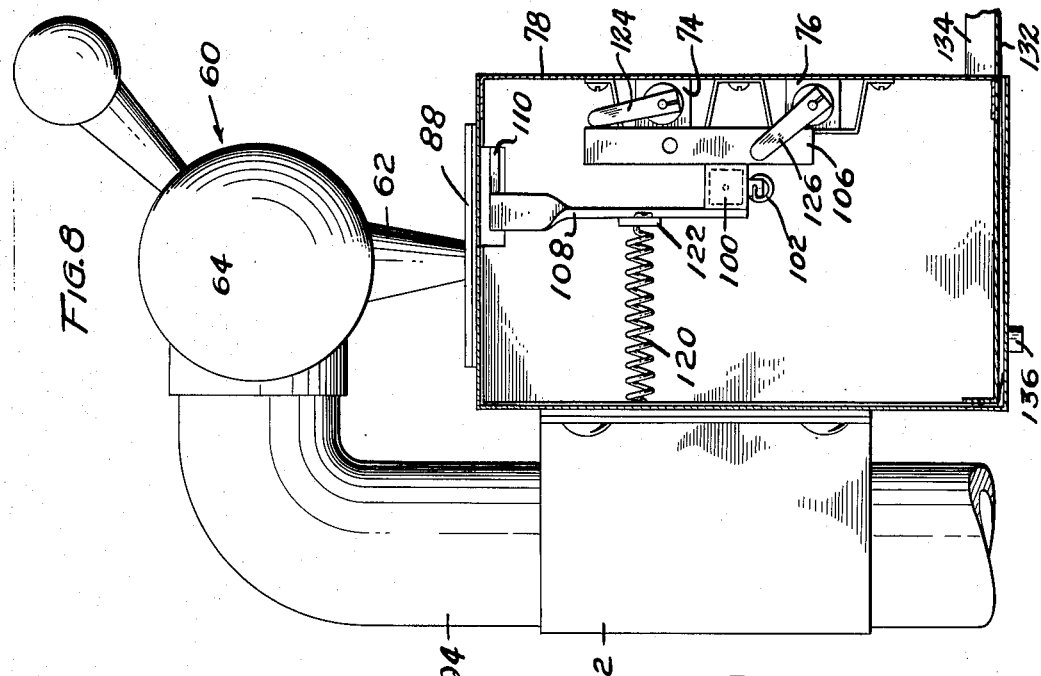
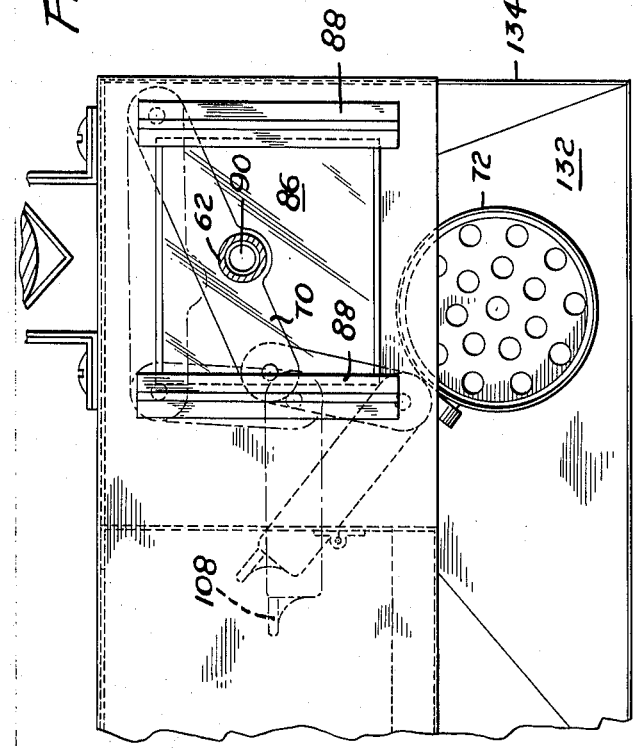
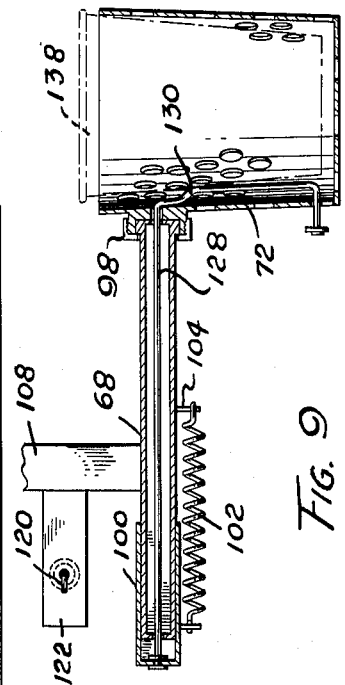
INVENTOR.
ARTHUR DEUTCH
BY Pattison, Wright
& Pattison
ATTORNEYS

United States Patent Office 3,252,654
Patented May 24, 1966

3,252,654
DISPENSING SPIGOT CONTROLLING AND
RECORDING DEVICE
Arthur Deutch, 8400 NW. 10th Ave., Miami, Fla.
Filed June 17, 1963, Ser. No. 289,171
5 Claims. (Cl. 235—94)

The present invention relates generally to liquid dispensers and more particularly and specifically to a regulator and recorder for a liquid dispensing spigot.

This application constitutes a continuation-in-part of my co-pending application, Serial No. 176,582, now abandoned.

Heretofore numerous efforts have been made to provide mechanisms for regulating and recording the quantities of liquids dispensed from a container. A particular need for such devices has been determined to exist in bars, for example, where the dispensing of beer or ale by employees is sought to be controlled and tabulated. Most prior art devices designed to accomplish this desired result have been extremely complex and costly in installation and maintenance, thus rendering them impractical.

It is a general object of the present invention to provide a simple and inexpensive attachment for substantially any existing liquid dispensing spigot, such as is normally found in a bar or fountain, which will prevent the dispensing of liquids except in measured amounts which are recorded on each dispensing operation.

Generally, it is a further object of the present invention to provide a liquid dispensing spigot control and recording device which is of extremely simple and inexpensive design, manufacture, installation, and operation, thereby eliminating the major disadvantages inherent in prior art devices.

A particular object of this invention resides in the provision of a small housing which is secured about a liquid dispensing spigot outlet and which contains a spigot guard or obstruction mounted in association with a mechanical recorder so that each displacement of the guard is recorded.

Another object of the present invention rests in the provision of a glass or receptacle holder associated in combination with a spigot guard and recorder which is automatically positioned to receive liquid when the spigot guard is displaced.

Still a further object of this invention lies in the provision of a combination as described wherein the mechanical recorder is maintained in an inaccessible, tamperproof condition at all times.

A further object of the present invention is the provision of a dispensing spigot guard and recorder including a spigot obstruction, recorder and receptacle holder in fixed and cooperative relationship whereby the receptacle holder is capable of limited pivotal movement about a horizontal axis.

A still further object of this invention rests in the provision of a dispensing unit of the type generally described wherein a plurality of mechanical recorders are provided with selector-actuator means therefor controlled by the size of the receptacle filled by the dispensing unit.

Still further objects and advantages of the present invention will become more readily apparent to those skilled in the art when the following general statement and description are read in the light of the accompanying drawings.

The nature of the present invention may be stated in general terms as relating to a liquid dispensing guard and recorder apparatus for use in combination with a liquid dispensing spigot, including a cabinet element having a portion of one side wall removed, a spigot receiving and retaining opening in the top of said cabinet, a horizontal arm supported longitudinally within said cabinet on a vertical pivot intermediate the length thereof, a liquid receptacle holder on one end of said arm, a spigot closing tongue supported on said arm vertically offset above said receptacle holder, a mechanical recorder engageable and operable by the second end of said arm, and resilient means biasing said arm to position the tongue beneath and in closing condition relative to the spigot, and with the arm out of engagement with the recorder.

Referring now to the accompanying drawings in which like numerals designate similar parts throughout the several views:

FIG. 6 is a fragmentary top plan view of the device of FIG. 5;

FIG. 8 is a vertical sectional view taken on line 8—8, FIG. 7;

FIG. 9 is a vertical sectional view taken on line 9—9, FIG. 7.

Figure 1:
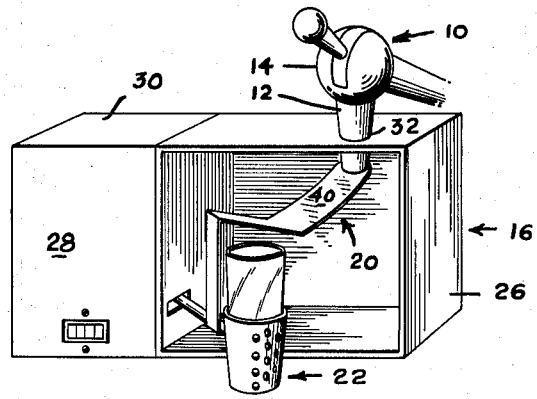
FIG. 1 is a perspective view of the inventive mechanism positioned on a dispensing spigot.

In the primary embodiment of the present invention, as shown in FIGS. 1 to 4 of the accompanying drawings, 10 generally designates a liquid dispensing spigot such as is used in connection with a draft beer dispenser and which includes a dispensing nozzle 12 depending from a hand operated valve 14.

Associated with the spigot 10 is a dispensing guard and recorder mechanism which includes, generally, a housing 16, an operating arm 18, a spigot closing tongue 20, a receptacle holder 22, and a mechanical counter device 24.

As is shown in the preferred embodiment, the housing 16 consists of a rectangular box element 26 having one open vertical side and which is provided with a closed chamber 28 formed on one end thereof. The top wall 30 of the housing above the open sided portion thereof is provided with an opening 32 adapted to receive vertically therein the dispensing nozzle 12 of the spigot which may be retained therein frictionally or by any suitable lock nut means (not shown).

The operating arm 18 consists of an elongated rod 34 having one end located within the closed chamber 28 and the other projecting through a slot 36 in the adjacent end wall of the housing 26 to position the extreme end thereof in the open sided chamber of the housing 26. A vertical pin 38 is secured adjacent the slotted end wall of housing 26 within the chamber 28 and vertically intersects the arm 18 to provide a pivotal support therefor about that point.

The tongue element 20 is formed of a flat spring metal material and consists of a slightly bowed section 40 of elongated arcuate configuration which is supported horizontally beneath and in close adjacency to the outlet end of the spigot nozzle 12 by an L-shaped extension 42 thereof, the extreme end of which is mounted on arm 18 intermediate its length. The leg elements of the L-shaped extension 42 lie in offset planes so that the arcuate section 40 is positioned in offset relationship to the axis of arm 18.

Figure 4:
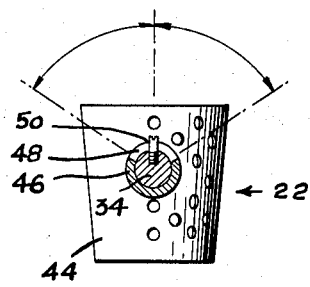
FIG. 4 is a vertical section taken on line 4—4, FIG. 2.

The extreme end of the arm 18 within the open sided chamber of the housing supports the receptacle holder or support 22. The receptacle holder or support 22 consists of a perforated metallic cup 44 having a tubular sleeve 46 rigidly affixed to one vertical surface thereof which telescopically receives the extended end of the rod 34 constituting arm 18. As is best seen in FIG. 4, the upper portion of sleeve 46 is provided with a transverse slot 48 formed therein and extending for approximately 25° from either side of the vertical centerline of the tube and the rod 34. An elongated set screw 50 is engaged in the rod 34 on its vertical centerline to project outwardly through the slot 48.

The mechanical counter 24 is fixed to one vertical inside wall of the closed chamber 28 and presents a lever arm 52 at a vertically inclined angle therefrom and intersecting the horizontal plane of the pivotal arm 18. That end of the arm 18 positioned within the enclosed chamber 28 is connected by a coil spring 54 to that vertical wall of the enclosed chamber opposite to the counter normally urging the arm to the dotted line position shown in FIG. 3 of the drawings.

Figure 3:
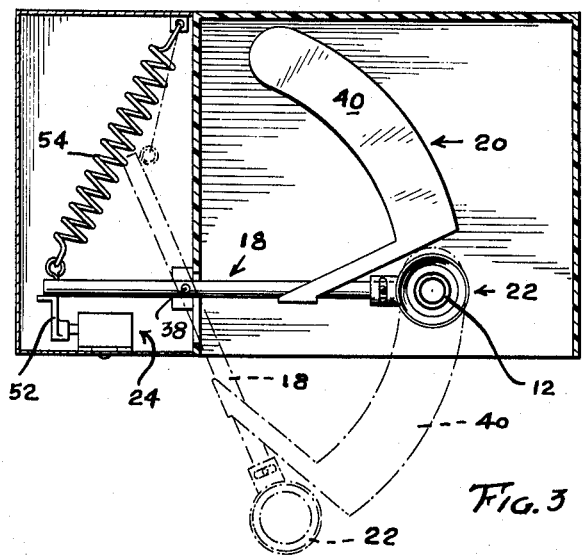
FIG. 3 is a horizontal section taken on line 3—3, FIG. 2.

As is best illustrated in FIG. 3 of the drawings, the normal positioning of the pivotal arm 18 as shown in dotted line will position the inner extreme end of the tongue section 40 beneath the nozzle outlet of the spigot and will position the receptacle holder 22 in a projected position outwardly from the open side of the housing. When it is desired to dispense liquid, a glass 56, or like receptacle, is placed in the open top of the receptacle holder 22 which is then manually moved inwardly of the open side of the housing to a position vertically aligned beneath the nozzle outlet 12. This position is shown in full line in FIG. 3, which illustrates the relocation of the tongue 40 inwardly of the housing and completely offset from beneath the nozzle 12. It is also seen from FIG. 3 that the moving of the receptacle holder 22 to a position beneath the nozzle will bring the second end of arm 18 into operable contact with the lever 52 of counter 24 thereby recording the arm actuation on the counter. When in this position the hand valve 14 is operated to fill the glass or cup in the receptacle holder which is then, under bias of spring 54, allowed to move outwardly from the open side of the housing where it may be lifted free of the holder for service.

Figure 2:
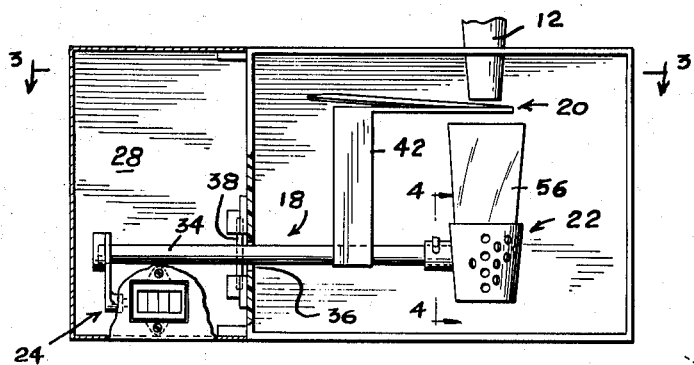
FIG. 2 is a front elevation of the mechanism of FIG. 1 in partial vertical section.

It is also to be noted from FIG. 4 of the drawings that the receptacle holder with a glass therein may be tilted about its vertical axis within a 25° limitation in either direction from the vertical to permit the dispensing liquid to impinge upon the side wall of the glass or cup as is commonly necessary in drawing of beer which is under pressure to control the amount of foam or head on the liquid. It is also seen in FIG. 2 of the drawings that there is a limited space provided between the top of a normal glass or cup 56 and the outlet end of nozzle 12 to permit the glass to be oscillated vertically within those limits to increase the foaming action of liquid being dispensed thereinto when such becomes necessary.

In the secondary embodiment of the present invention, as shown in FIGS. 5 through 9 of the accompanying drawings, 60 generally designates a liquid dispensing spigot such as is used in connection with a draft beer dispenser, or the like, and which includes a depending dispensing nozzle 62 below a hand operated valve 64.

Associated in combination with the spigot 60 is a dispensing guard and recorder mechanism which includes, generally, a housing 66, an operating arm 68, a spigot sealing tongue 70, a receptacle holder 72, and separate mechanical counter devices 74 and 76.

As is seen in the accompanying drawings, the housing consists of a rectangular box-like element 78 having open vertical side, a portion of which is closed to form a closed chamber or housing 80 adjacent one end thereof. The top wall 82 of the housing above the open sided portion thereof is provided with a rectangular opening 84 normally closed by a transparent panel 86 which is slidably secured within parallel opposed guide strips 88 secured on the upper face of the unit. The transparent panel is provided in a central portion thereof with a circular opening 90 designed to receive therein the lower depending end of the dispensing nozzle 62 below the hand valve when the unit is secured by a suitable bracket clamp 92 to the vertical conduit 94 upon which the hand valve is located.

The operating arm 68 consists of an elongated tube having one end located within the closed chamber 80 and the other projecting through a resilient bearing 96 in the side wall of the chamber into the adjacent open end of the dispensing housing unit 66. The resilient bearing or bushing forms a pivotal support for the arm.

That end of the operating arm 68 projecting into the open sided housing supports a cup-like receptacle holder 72 thereon through the medium of a threaded lock collar 98 interconnecting the holder and the arm. The second end of the operating arm, within the enclosed chamber 80, telescopically receives an elongated sleeve 100 which is connected externally thereof by a coil spring 102 to an intermediate point 104 on the length of the arm within the enclosed chamber, thereby biasing the sleeve to a fully telescoped position upon the tubular arm. The sleeve 100 is provided with a vertical actuator arm 106 rigidly secured thereto intermediate the length thereof.

The operating arm 68 is further provided intermediate its length with a vertical plate 108 which is turned at right angles adjacent its upper end to project horizontally through a slot 110 into the open end of the housing unit 66 where it is secured on a vertical pin 112 to one end of a crank arm 114, the second end of which is secured by a vertical pin 116 to one end of the sealing tongue 70, the second end of which tongue is pivotally secured as at 118 to the top wall of the housing unit. A spring 120 interconnects a horizontal projecting arm 122 on the vertical plate 108 with the rearward wall of the enclosed chamber normally biasing the inwardly projecting end of the operating arm toward the rear of the enclosed chamber and, by the same token, biasing the receptacle holding end of the arm within the open sided chamber outwardly thereof.

The tongue element 70, pivotally secured horizontally beneath the top wall of the housing immediately beneath the transparent panel, is so positioned and so linked with the vertical plate 108 on the operating arm through the pivotal linkage therewith as to be movable into and out of sealing or nozzle blocking position beneath the depending end of the spigot. The linkage, as best shown in FIG. 6, is so arranged as to locate the tongue in a nozzle closing or sealing position when the operating arm is at rest position under influence of the biasing spring 120, and to be removed from beneath the nozzle opening when the receptacle holder is moved inwardly of the open side of the unit beneath the nozzle against the bias of the spring 120.

Figure 5:
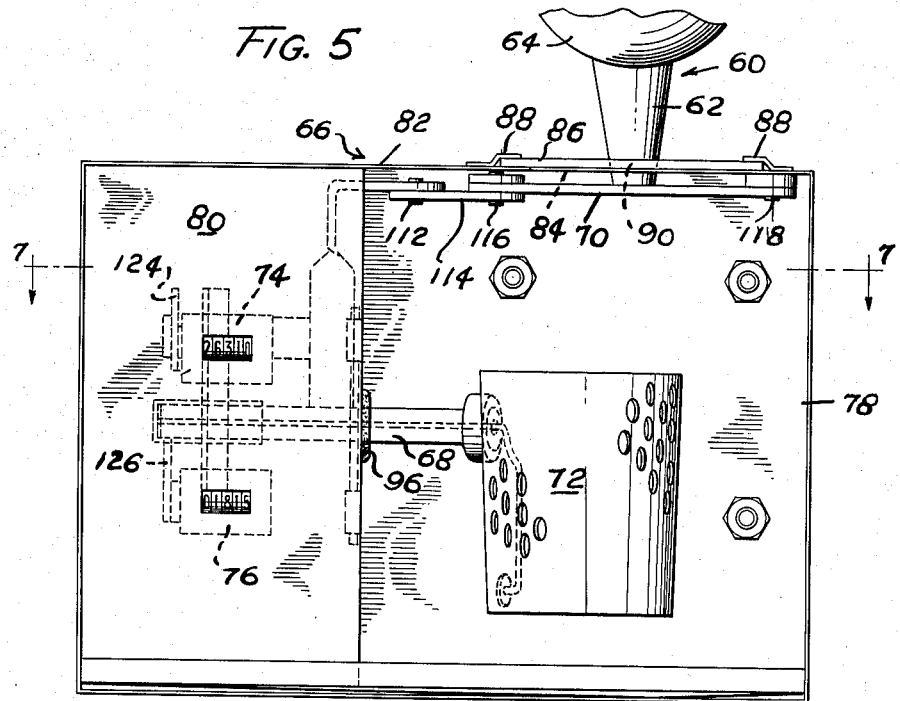
FIG. 5 is a front elevation of a modified form of the invention.

The two mechanical counters 74 and 76 are secured to the inner face of the front wall of the enclosed chamber 80 vertically one above the other with each being provided with a trip lever 124 and 126 respectively projecting rearwardly into said chamber. The trip levers of each counter are offset vertically one from the other, as best seen in FIGS. 5 and 7, a distance greater than the thickness of the actuator bar 106 supported on the movable sleeve 100 on the extreme inner end of the operating arm 68.

To complete the assembly, an elongated rod 128 is secured longitudinally within the tubular operating arm with one end projecting through the rearward or inner end of said arm to be rigidly fixed to the outer end of the sleeve element 100, with the second end thereof projecting through the threaded coupling cap and the receptacle holder to provide an arcuate shoulder 130 projecting into the receptacle holder for a predetermined distance under the influence of the sleeve operating arm biasing spring 102.

Figure 7:
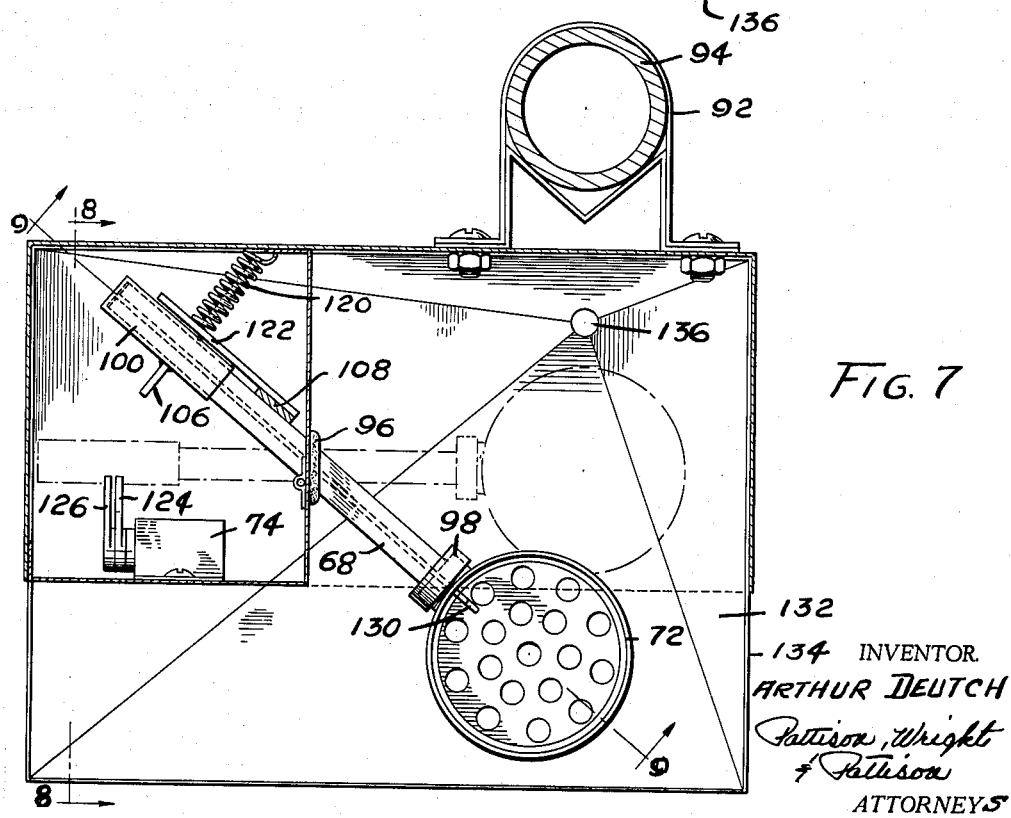
FIG. 7 is a horizontal sectional view taken on line 7—7, FIG. 5.

As is seen in FIGS. 7 and 8 of the drawings, the dispensing unit housing may be finished with a bottom tray element 132 projecting outwardly below the open side of the housing with a raised rail 134 thereabout and with a bottom wall sloping in converging directions inwardly into a drain outlet 136 within the bottom wall of the housing.

As is clearly seen from the drawings, the normal positioning of the pivotal operating arm 68, as shown in FIGS. 6 and 7, places the receptacle holder 72 in an outwardly projecting position in front of the open side of the unit housing where it is convenient to vertically receive therein a glass or other receptacle 138. When a receptacle is placed in the holder, the holder is moved under hand pressure inwardly of the housing on the pivotal operating arm to place the receptacle immediately beneath the depending nozzle 62 opening through the transparent panel in the upper wall of the housing.

As the receptacle holder is moved inwardly of the housing the remote end of the operating arm, within the enclosed chamber, is simultaneously moved toward the front wall of the enclosed chamber against the bias of spring 120, thus actuating the lever linkage between said operating arm and the sealing tongue, moving the sealing tongue to the dotted line position shown in FIG. 6 clear from beneath the depending nozzle opening, and at the same time moving the actuator bar 106 into engagement with one or the other of the counter trigger levers 124 and 126 on the front wall of the housing.

The difference in diameter between, for example, a 6 and a 9 ounce glass will permit a 6 ounce glass to be vertically inserted in the receptacle holder between the normal position of the push rod 128 and the opposite side of the holder whereupon the actuator bar 106 will be aligned to operate one of the two mechanical counters. The use of a larger diameter glass will cause the glass, upon insertion vertically into the receptacle holder and engaging shoulder 130, to move the operating rod outwardly of the receptacle thereby causing the sleeve 100 to move outwardly on the operating arm against the bias of spring 102 and thereby shifting the actuator bar 106 longitudinally of the operating arm to align it with the trigger lever of the second counter. By this feature the number of 6 and 9 ounce glasses of liquid dispensed may be separately tabulated on the two separate counters.

From the foregoing it can be seen that a simple and inexpensive attachment is provided for a liquid dispensing spigot which safeguards against the possible withdrawal of liquid from the spigot without recording such withdrawal on the mechanical counter element of the combination. It is also seen that the structure which provides the foregoing safeguard is of extremely simple design and operation and one which is durable and maintenance free.

Having thus described and explained the invention in terms of the components forming the cooperative combination constituting the present invention, what I desire to claim is:

1. In combination with the vertically disposed nozzle outlet of a dispensing spigot, an elongated horizontal arm supported on a vertical pivot, a nozzle blocking tongue fixed on and above said arm, a receptacle holder on said arm vertically offset from said tongue, plural mechanical counters, an actuator for said counters operatively associated with said receptacle holder, and means engageable by a receptacle in said holder to selectively couple said actuator with one of said counters.

2. In combination with the nozzle outlet of a dispensing spigot, an elongated arm horizontally fixed below said nozzle on a vertical pivot, a nozzle blocking tongue associated with said arm, plural mechanical recording counters fixed adjacent said arm, a counter engaging actuator on said arm, and means selectively positioning said actuator in operable relationship to one of said counters.

3. In combination with the nozzle outlet of a dispensing spigot, an elongated arm horizontally fixed beneath said nozzle on a vertical pivot, a nozzle blocking tongue associated with said arm, a receptacle holder on said arm offset vertically from said tongue, plural recording counters spaced from said arm, a shiftable counter engaging actuator on said arm, and a spring biased push rod engaging said actuator for selectively shifting the position thereof relative to said counters.

4. A combination as defined in claim 3 wherein said push rod projects for a spaced distance radially into said receptacle holder.

5. In combination with the vertically disposed nozzle outlet of a liquid dispensing spigot, an elongated arm fixed for horizontal pivotal movement below said nozzle, a nozzle blocking tongue supported by said arm and movable therewith into and out of blocking relationship with said nozzle, a receptacle fixed on said arm and movable therewith into and out of position beneath said nozzle, resilient means engaging and biasing said pivotal arm to position said tongue in nozzle blocking position, and a counter device having an operating lever in the pivotal path of said arm, wherein said tongue and receptacle support are vertically offset on said arm.

References Cited by the Examiner

UNITED STATES PATENTS

| | | | |
|---|---|---|---|
| 216,990 | 7/1879 | Williams | 235—94 |
| 486,735 | 11/1892 | Ostertag | 235—98 |
| 504,610 | 9/1893 | Oppman | 235—98 |
| 773,033 | 10/1904 | Schneider | 141—351 |
| 1,062,035 | 5/1913 | Ritchey | 235—94 |
| 1,538,214 | 5/1925 | Rath | 222—38 |
| 1,953,163 | 4/1934 | Geddes | 222—38 |
| 2,110,043 | 3/1938 | Hutsell | 141—94 |
| 2,116,966 | 5/1938 | Barlow | 222—38 |
| 2,504,376 | 4/1950 | Barone | 235—117.1 |
| 2,647,660 | 8/1953 | Arena | 222—38 |

FOREIGN PATENTS

| | | |
|---|---|---|
| 78,707 | 1895 | Germany. |
| 85,323 | 2/1895 | Germany. |
| 20,316 | 9/1904 | Great Britain. |

LEO SMILOW, *Primary Examiner.*